United States Patent
Fukuta et al.

(10) Patent No.: US 8,083,968 B2
(45) Date of Patent: Dec. 27, 2011

(54) SOLID SCINTILLATOR, RADIATION DETECTOR, AND X-RAY TOMOGRAPHIC IMAGING APPARATUS

(75) Inventors: Yukihiro Fukuta, Yokohama (JP); Masami Okamura, Yokohama (JP); Yasuhiro Shirakawa, Yokohama (JP)

(73) Assignees: Kabushiki Kaisha Toshiba, Tokyo (JP); Toshiba Materials Co., Ltd., Yokohama-Shi (JP)

(*) Notice: Subject to any disclaimer, the term of this patent is extended or adjusted under 35 U.S.C. 154(b) by 0 days.

(21) Appl. No.: 12/922,033

(22) PCT Filed: Feb. 23, 2009

(86) PCT No.: PCT/JP2009/053158
§ 371 (c)(1), (2), (4) Date: Sep. 10, 2010

(87) PCT Pub. No.: WO2009/113379
PCT Pub. Date: Sep. 17, 2009

(65) Prior Publication Data
US 2011/0024684 A1    Feb. 3, 2011

(30) Foreign Application Priority Data
Mar. 10, 2008  (JP) .................................. 2008-060022

(51) Int. Cl.
*C09K 11/02* (2006.01)
*G01T 3/06* (2006.01)
(52) U.S. Cl. ............................. 252/301.4 R; 250/390.11
(58) Field of Classification Search ........... 252/301.4 R, 252/301.17; 250/361 R, 390.11
See application file for complete search history.

(56) References Cited

U.S. PATENT DOCUMENTS

| | | | | |
|---|---|---|---|---|
| 6,458,295 | B1* | 10/2002 | Yamada et al. | 252/301.4 R |
| 2003/0075706 | A1 | 4/2003 | Shiang et al. | |
| 2003/0127630 | A1* | 7/2003 | Vartuli et al. | 252/301.4 R |
| 2004/0084655 | A1 | 5/2004 | Vartuli et al. | |
| 2005/0093431 | A1 | 5/2005 | Hancu et al. | |
| 2005/0093442 | A1* | 5/2005 | Setlur et al. | 313/512 |
| 2006/0284196 | A1 | 12/2006 | Setlur et al. | |
| 2007/0138942 | A1 | 6/2007 | Ikada et al. | |

FOREIGN PATENT DOCUMENTS

| | | |
|---|---|---|
| JP | 2003 119070 | 4/2003 |
| JP | 2005 120251 | 5/2005 |
| JP | 2005 126718 | 5/2005 |
| JP | 2007 510040 | 4/2007 |
| JP | 2007 186399 | 7/2007 |
| JP | 2007 246653 | 9/2007 |
| WO | 99 33934 | 7/1999 |

OTHER PUBLICATIONS

International Search Report issued May 19, 2009 in PCT/JP09/053158 filed Feb. 23, 2009.
International Preliminary Report on Patentability issued Oct. 12, 2010 in PCT/JP09/053158 filed Feb. 23, 2009.

* cited by examiner

*Primary Examiner* — Jerry Lorengo
*Assistant Examiner* — Lynne Edmondson
(74) *Attorney, Agent, or Firm* — Oblon, Spivak, McClelland, Maier & Neustadt, L.L.P.

(57) ABSTRACT

The solid scintillator according to the present invention is expressed by the following formula (1):

[Formula 1]

$$(M_{1-x-y}Gd_xCe_y)_3J_5O_{12} \qquad (1)$$

(wherein M is at least one element of La and Tb; J is at least one metal selected from the group consisting of Al, Ga, and In; and x and y are such that $0.5 \leqq x \leqq 1$ and $0.000001 \leqq y \leqq 0.2$). The transmittance of light having a wavelength of 550 nm measured at a thickness of 2 mm is equal to or greater than 40%. The solid scintillator according to the present invention can be manufactured at low cost, has a high light emitting power, and does not release Cd because Cd is not contained.

20 Claims, No Drawings

SOLID SCINTILLATOR, RADIATION DETECTOR, AND X-RAY TOMOGRAPHIC IMAGING APPARATUS

CROSS REFERENCE TO RELATED APPLICATION

This application is a 371 of PCT/JP09/053158, filed on Feb. 23, 2009, and claims priority to Japanese Patent Application No. 2008-060022, filed on Mar. 10, 2008.

TECHNICAL FIELD

The present invention relates to a technique for converting radiation such as X-rays to visible light, and more particularly to a solid scintillator, a radiation detector using this solid scintillator, and an x-ray tomographic imaging apparatus.

BACKGROUND ART

Inspection using a radiographic inspection apparatus such as an x-ray tomographic imaging apparatus (X-ray CT scanner) is performed in medical diagnosis, industrial inspection, and security fields. In general, the X-ray CT scanner includes an X-ray tube (X-ray source) which emits a fan-beam X-ray or a fan-shaped x-ray beam; an X-ray detector arranged facing the X-ray tube and having a large number of X-ray detection elements; and an image reconstruction apparatus which reconstructs an image based on data from the X-ray detector. An object is placed between the X-ray tube and the X-ray detector, and a tomographic plane thereof is imaged by fan-beam X-ray radiation.

The X-ray CT scanner emits a fan-beam X-ray and collects X-ray absorption data. The X-ray CT scanner repeats this processing by changing the radiation angle to the tomographic plane, for example, each by one degree. Then, the X-ray CT scanner analyzes the obtained data by a computer to calculate the X-ray absorption rate on the tomographic plane of the object and constructs an image of the tomographic plane according to the X-ray absorption rate.

As the X-ray detector of the X-ray CT scanner, there is used a solid scintillator which emits visible light by X-ray stimulation. The solid scintillator refers to a scintillator made of ceramic or single crystal.

It is preferable to use a solid scintillator as the X-ray detector of the X-ray CT scanner because the use of the solid scintillator as the X-ray detector can reduce the size of a detection element and thus can easily increase the number of channels for higher resolution.

As the solid scintillator used as a radiation detector such as the X-ray detector, conventionally there are known a single crystal such as cadmium tungstate ($CdWO_4$), sodium iodide (NaI), and cesium iodide (CsI); europium-activated barium fluorochloride (BaFCl:Eu); terbium-activated lanthanum oxybromide (LaOBr:Tb); thallium-activated cesium iodide (CsI:Tl); calcium tungstate ($CaWO_4$); cadmium tungstate ($CdWO_4$); praseodymium-activated gadolinium oxysulfide ($Gd_2O_2S$:Pr) disclosed in Japanese Patent Laid-Open No. S58-204088 (Patent document 1); and the like.

Patent Document 1: Japanese Patent Laid-Open No. S58-204088

DISCLOSURE OF THE INVENTION

Problems to be Solved by the Invention

Of them, the praseodymium-activated gadolinium oxysulfide ($Gd_2O_2S$:Pr) disclosed in Patent document 1 is preferable as the X-ray detection scintillator because the praseodymium-activated gadolinium oxysulfide ($Gd_2O_2S$:Pr) has a large X-ray absorption coefficient and a short fluorescence decay time. In particular, when the X-ray CT scanner is used in a medical field, the praseodymium-activated gadolinium oxysulfide ($Gd_2O_2S$:Pr) having a large X-ray absorption coefficient and a short fluorescence decay time is preferable in terms of reduction in exposure amount and diagnosis time.

However, rare-earth oxysulfide ceramics such as praseodymium-activated gadolinium oxysulfide needs to be manufactured using HIP (hot isostatic pressing) and thus has a problem with higher manufacturing costs than using hot pressing (uni-axially pressing) or vacuum sintering. Moreover, when the X-ray CT scanner is used in a security field such as baggage-screening devices, the detection element has a large area, and thus the scintillator is not required very much to have a large X-ray absorption coefficient or a short fluorescence decay time. Therefore, the praseodymium-activated gadolinium oxysulfide has a big problem with high manufacturing costs.

In contrast to this, cadmium tungstate (CdWO4) single crystal scintillator is inferior to the rare-earth oxysulfide ceramic scintillator such as praseodymium-activated gadolinium oxysulfide in terms of characteristics but superior in terms of costs, and thus is preferable as the scintillator for an X-ray CT scanner in the security field. However, Cd is a hazardous substance and thus has a problem that the cadmium tungstate ($CdWO_4$) single crystal scintillator has a risk of deteriorating the environment.

In view of the above circumstances, the present invention has been made, and an object of the present invention is to provide a solid scintillator which can be manufactured at low cost, has high light emitting power, and does not contain Cd, a radiation detector using this solid scintillator, and an x-ray tomographic imaging apparatus.

Means for Solving the Problems

The solid scintillator according to an aspect of the present invention is to solve the above problems and is expressed by the following formula (1).

[Formula 1]

$$(M_{1-x-y}Gd_xCe_y)_3J_5O_{12} \qquad (1)$$

(wherein M is at least one element of La and Tb; J is at least one metal selected from the group consisting of Al, Ga, and In; and x and y are such that $0.5 \leq x \leq 1$ and $0.000001 \leq y \leq 0.2$).

The transmittance of light having a wavelength of 550 nm measured at a thickness of 2 mm is equal to or greater than 40%.

Moreover, the solid scintillator according to another aspect of the present invention is to solve the above problems and is expressed by the following formula (2).

[Formula 2]

$$(M_{1-x-y}Gd_xPr_y)_3J_5O_{12} \qquad (2)$$

(wherein M is at least one element of La and Tb; J is at least one metal selected from the group consisting of Al, Ga, and In; and x and y are such that $0.5 \leq x \leq 1$ and $0.000001 \leq y \leq 0.2$).

The transmittance of light having a wavelength of 610 nm measured at a thickness of 2 mm is equal to or greater than 40%.

Further, the radiation detector according to another aspect of the present invention is to solve the above problems and uses the solid scintillator.

Moreover, the x-ray tomographic imaging apparatus according to another aspect of the present invention is to solve the above problems and uses the radiation detector.

Advantageous Effects of the Invention

The solid scintillator according to the present invention can provide a solid scintillator which can be manufactured at low cost, has a high light emitting power, and does not contain Cd.

Moreover, the radiation detector according to the present invention can provide a radiation detector which can be manufactured at low cost, has a high light emitting power, and there is no risk of releasing Cd at its disposal.

Further, the x-ray tomographic imaging apparatus according to the present invention can provide an x-ray tomographic imaging apparatus which can be manufactured at low cost, has a small amount of exposure, and there is no risk of releasing Cd at its disposal.

BEST MODE FOR CARRYING OUT THE INVENTION

The solid scintillator according to the present invention includes a solid scintillator containing Ce as the activator (hereinafter referred to as a "first solid scintillator") and a solid scintillator containing Pr as the activator (hereinafter referred to as a "second solid scintillator").

[First Solid Scintillator]

The first solid scintillator is a rare-earth aluminate compound having a composition expressed by the following formula (1).

[Formula 3]

$$(M_{1-x-y}Gd_xCe_y)_3J_5O_{12} \quad (1)$$

In the formula (1), M is at least one element of La and Tb.

In the formula (1), J is at least one metal selected from the group consisting of Al, Ga, and In.

In the formula (1), x is such that $0.5 \leq x \leq 1$. When x is such that $0.5 \leq x \leq 1$, that is, Gd content of the total amount of M, Gd, and Ce is equal to or greater than 50 mol % and equal to or less than 100 mol %, the scintillator has a high X-ray absorption coefficient and light-emitting efficiency, and thus is preferable.

When x is less than 0.5, that is, Gd content of the total amount of M, Gd, and Ce is less than 50 mol %, X-ray cannot be sufficiently absorbed in the scintillator and thus there is a risk of lowering the light emitting power.

In the formula (1), y is $0.000001 \leq y \leq 0.2$, and preferably $0.001 \leq y \leq 0.1$.

Ce is an activator for increasing the light-emitting efficiency of the rare-earth aluminate compound expressed by the formula (1). When y is $0.000001 \leq y \leq 0.2$, that is, Ce content of the total amount of M, Gd, and Ce is equal to or greater than 0.0001 mol% and equal to or less than 20 mol %, the scintillator has a high light-emitting efficiency and thus is preferable.

When y is less than 0.000001 or exceeds 0.2, that is, Ce content of the total amount of M, Gd, and Ce is less than 0.0001 mol %, the content of Ce contributing to light-emitting runs short, and thus the light-emitting efficiency becomes low. Meanwhile, when y exceeds 20 mol %, the material constituting the scintillator is colored and thus transparency becomes low. Therefore, there is a risk that a sufficient light emitting power cannot be obtained.

The first solid scintillator may be either a single crystal or polycrystalline ceramics.

The first solid scintillator has a high X-ray absorption coefficient and light-emitting efficiency. Therefore, when a scintillator with a thickness of 2 mm is used, the transmittance of light, which is emitted from Ce by X-ray irradiation and has a wavelength of 550 nm, becomes equal to or greater than 40%.

Here, the transmittance means a linear transmittance. The linear transmittance is an indication of transparency of the first solid scintillator made of a rare-earth aluminate compound. In the case where the linear transmittance (transparency) of the first solid scintillator becomes higher, the more light reaches the photoreceiver such as a photodiode. Therefore, when the linear transmittance becomes higher, the light output increases more.

When a scintillator having a transmittance of 40% or higher is used as the solid scintillator, the light output can be considered to be sufficiently high.

The first solid scintillator can be manufactured, for example, in such a manner that a rare-earth oxide powder is manufactured by firing a mixed powder prepared by mixing oxides such as $Tb_4O_7$, $La_2O_3$, $Gd_2O_3$, $Al_2O_3$, $Ga_2O_3$, $CeO_2$ and the like under an inert gas atmosphere such as Ar and the like; the rare-earth oxide powder is molded by rubber pressing or the like; and then the molded body is heated by hot pressing (uni-axially pressing) or vacuum sintering until densification is attained.

The conventional rare-earth oxysulfide ceramics such as the praseodymium-activated gadolinium oxysulfide is pyrolyzed at high temperature, and thus needs to be manufactured by HIP (hot isostatic pressing) using a metal capsule such as Ta. On the contrary, the first solid scintillator according to the present invention is not pyrolyzed at high temperature, and thus does not need to use a metal capsule. Therefore, the first solid scintillator can be manufactured by hot pressing or vacuum sintering simpler and lower in manufacturing cost than the HIP.

The heat processing using hot pressing and vacuum sintering is usually performed at temperatures 1400° C. to 1700° C. and for one to 10 hours.

When the heating and pressing using hot pressing is performed, at least the atmosphere in a processing chamber in the hot pressing processor is preferably replaced with an inert gas such as an argon gas.

The first solid scintillator can be manufactured by hot pressing or vacuum sintering at low cost, has a high light emitting power, and can provide a solid scintillator which does not contain Cd.

[Second Solid Scintillator]

The second solid scintillator is a rare-earth aluminate compound having a composition expressed by the following formula (2).

[Formula 4]

$$(M_{1-x-y}Gd_xPr_y)_3J_5O_{12} \quad (2)$$

In the formula (2), M and J are the same as in the above formula (1) and thus the description is omitted.

In the formula (2), x is such that $0.5 \leq x \leq 1$. When x is $0.5 \leq x \leq 1$, that is, Gd content of the total amount of M, Gd, and Pr is equal to or greater than 50 mol % and equal to or less than 100 mol %, the scintillator has a high X-ray absorption coefficient and light-emitting efficiency and thus is preferable.

When x is less than 0.5, Gd content of the total amount of M, Gd, and Pr is less than 50 mol %, X-ray cannot be sufficiently absorbed in the scintillator and thus there is a risk that the light emitting power becomes low.

In the formula (2), y is $0.000001 \leq y \leq 0.2$, and preferably $0.0001 \leq y \leq 0.01$.

Pr is an activator for increasing the light-emitting efficiency of the rare-earth aluminate compound expressed by the formula (2). When y is $0.000001 \leq y \leq 0.2$, that is, Pr content of the total amount of M, Gd, and Pr is equal to or greater than 0.0001 mol % and equal to or less than 20 mol %, the scintillator has a high light-emitting efficiency and thus is preferable.

When y is less than 0.000001 or exceeds 0.2, that is, Pr content of the total amount of M, Gd, and Pr is less than 0.0001 mol %, the content of Pr contributing to light-emitting runs short, and thus the light-emitting efficiency becomes low. Meanwhile, when y exceeds 20 mol %, the material constituting the scintillator is colored and thus transparency becomes low. Therefore, there is a risk that a sufficient light emitting power cannot be obtained.

The second solid scintillator may be either a single crystal or polycrystalline ceramics.

The second solid scintillator has a high X-ray absorption coefficient and light-emitting efficiency. Therefore, when a scintillator with a thickness of 2 mm is used, the transmittance of light, which is emitted from Pr by X-ray irradiation and has a wavelength of 610 nm, becomes equal to or greater than 40%. When a scintillator having a transmittance of 40% or higher is used as the solid scintillator, the light output can be considered to be sufficiently high.

The second solid scintillator can be manufactured, for example, in such a manner that a rare-earth oxide powder is manufactured by firing a mixed powder prepared by mixing oxides such as $Tb_4O_7$, $La_2O_3$, $Gd_2O_3$, $Al_2O_3$, $Ga_2O_3$, $Pr_7O_{11}$ and the like under an inert gas atmosphere such as Ar and the like; and the rare-earth oxide powder is processed by hot pressing (uni-axially pressing) or vacuum sintering in the same manner as for the first solid scintillator until densification is attained.

The heat processing using hot pressing and vacuum sintering is usually performed at temperatures 1400° C. to 1700° C. and for one to 10 hours.

When the heating and pressing using hot pressing is performed, at least the atmosphere in a processing chamber in the hot pressing processor is preferably replaced with an inert gas such as an argon gas.

The second solid scintillator can be manufactured by hot pressing or vacuum sintering at low cost, has a high light emitting power, and can provide a solid scintillator which does not contain Cd.

The radiation detector according to the present invention is such that the solid scintillator according to the present invention is used, for example, as the X-ray detection element of the X-ray detector.

The radiation detector according to the present invention can be configured, for example, to include the solid scintillator and a photomultiplier tube which converts light emitted from the solid scintillator to electrical energy.

The radiation detector according to the present invention uses the solid scintillator according to the present invention, and thus can provide a radiation detector which can be manufactured at lower cost, has a higher light output and there is no risk of releasing Cd at its disposal in comparison with the use of the conventional solid scintillator.

The x-ray tomographic imaging apparatus according to the present invention is such that the solid scintillator according to the present invention is used as the X-ray detection element of the X-ray detector.

The x-ray tomographic imaging apparatus according to the present invention can be configured, for example, to include an X-ray tube, an X-ray detector using the solid scintillator according to the present invention, and an image reconstruction apparatus which reconstructs an image based on data from the X-ray detector.

The x-ray tomographic imaging apparatus according to the present invention uses the solid scintillator according to the present invention, and thus can provide an x-ray tomographic imaging apparatus which can be manufactured at lower cost, can reduce the amount of X-ray exposure and there is no risk of releasing Cd at its disposal in comparison with the use of the conventional solid scintillator.

EXAMPLES

Hereinafter, examples are given, but it should not be construed that the present invention is limited to the examples.

Example 1

$Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.0 μm expressed by $(Gd_{0.99}Ce_{0.01})_3Al_5O_{12}$ (Ce concentration of 1 mol %) was obtained.

The phosphor powder was molded by rubber pressing and the obtained molded body was set within a carbon mold of the hot pressing (uni-axially pressing) processor. Argon gas was filled as a pressing medium into the hot pressing processor and was subjected to a pressure (surface pressure) of 49 MPa and a temperature of 1700° C. for three hours. Then, a sintered body expressed by $(Gd_{0.99}Ce_{0.01})_3Al_5O_{12}$ (Ce concentration of 1 mol %) was obtained. The sintered body was mechanically processed with a multi-wire saw to fabricate a ceramic scintillator with 25 mm high×25 mm wide×2 mm thick.

When an X-ray with a tube voltage of 120 Kvp is emitted, the ceramic scintillator emits visible light with a peak wavelength near 550 nm. For this reason, the linear transmittance of light with a wavelength of 550 nm was measured as the indication of transparency of the ceramic scintillator. Specifically, a surface of 25 mm×25 mm square of the ceramic scintillator was irradiated with light containing a wavelength of 550 nm. Then, the linear transmittance of light with a wavelength of 550 nm (hereinafter the linear transmittance is referred to simply as "transmittance") was measured at a thickness of 2 mm. The transmittance was 52%.

Moreover, the light output of the ceramic scintillator was measured. Specifically, in order to block soft X-rays, a 120 Kvp X-ray was transmitted through a 20 mm Al filter and was emitted to one surface of 25 mm×25 mm square of the ceramic scintillator. Then, the value of current flowing through a silicon photo diode provided on a surface on the rear side of the one surface was calculated as the light output. The light output of $CdWO_4$ as a comparative sample was also measured under the same conditions. The light output of the ceramic scintillator was calculated as a relative light output value (%) assuming that the light output of $CdWO_4$ was 100%. The relative light output value (%) was 128%.

The results are shown in Table 1.

Example 2

$Tb_4O_7$, $Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 4.8 μm expressed by $(Tb_{0.49}Gd_{0.5}Ce_{0.01})_3Al_5O_{12}$ (Ce concentration of 1 mol %) was obtained.

A sintered body expressed by $(Tb_{0.49}Gd_{0.5}Ce_{0.01})_3Al_5O_{12}$ (Ce concentration of 1 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 63% and the relative light output value (%) was 142%. The results are shown in Table 1.

Example 3

$La_2O_3$, $Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.2 μm expressed by $(La_{0.49}Gd_{0.5}Ce_{0.01})_3Al_5O_{12}$ (Ce concentration of 1 mol %) was obtained.

A sintered body expressed by $(La_{0.49}Gd_{0.5}Ce_{0.01})_3Al_5O_{12}$ (Ce concentration of 1 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 48% and the relative light output value (%) was 117%. The results are shown in Table 1.

Example 4

$Tb_4O_7$, $Gd_2O_3$, $Ga_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 4.8 μm expressed by $(Tb_{0.3}Gd_{0.6}Ce_{0.1})_3Ga_5O_{12}$ (Ce concentration of 10 mol %) was obtained.

A sintered body expressed by $(Tb_{0.3}Gd_{0.6}Ce_{0.1})_3Ga_5O_{12}$ (Ce concentration of 10 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 58% and the relative light output value (%) was 138%. The results are shown in Table 1.

Example 5

$Gd_2O_3$, $Al_2O_3$ and $Pr_7O_{11}$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.0 μm expressed by $(Gd_{0.99}Pr_{0.01})_3Al_5O_{12}$ (Pr concentration of 1 mol %) was obtained.

A sintered body expressed by $(Gd_{0.99}Pr_{0.01})_3Al_5O_{12}$ (Pr concentration of 1 mol %) in the same manner as in the Example 1 except the use of the phosphor powder was obtained and a ceramic scintillator was fabricated.

When an X-ray with a tube voltage of 120 Kvp is emitted, the ceramic scintillator emits visible light with a peak wavelength near 610 nm. For this reason, the transmittance of the obtained ceramic scintillator was measured in the same manner as in the Example 1 except the use of light with a wavelength of 610 nm instead of light with a wavelength of 550 nm. Moreover, the light output of the ceramic scintillator was measured in the same manner as in the Example 1. The transmittance was 47% and the relative light output value (%) was 115%. The results are shown in Table 1.

Example 6

$Tb_4O_7$, $Gd_2O_3$, $Ga_2O_3$ and $Pr_7O_{11}$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 4.8 μm expressed by $(Tb_{0.03}Gd_{0.69}Pr_{0.01})_3Ga_5O_{12}$ (Pr concentration of 1 mol %) was obtained.

A sintered body expressed by $(Tb_{0.3}Gd_{0.69}Pr_{0.01})_3Ga_5O_{12}$ (Pr concentration of 1 mol %) in the same manner as in the Example 1 except the use of the phosphor powder was obtained and a ceramic scintillator was fabricated.

When an X-ray with a tube voltage of 120 Kvp is emitted, the ceramic scintillator emits visible light with a peak wavelength near 610 nm. For this reason, the transmittance of the obtained ceramic scintillator was measured in the same manner as in the Example 1 except the use of light with a wavelength of 610 nm instead of light with a wavelength of 550 nm. Moreover, the light output of the ceramic scintillator was measured in the same manner as in the Example 1. The transmittance was 57% and the relative light output value (%) was 132%. The results are shown in Table 1.

Comparative Example 1

$Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.0 μm expressed by $(Gd_{0.7}Ce_{0.3})_3Al_5O_{12}$ (Ce concentration of 30 mol %) was obtained.

A sintered body expressed by $(Gd_{0.7}Ce_{0.3})_3Al_5O_{12}$ (Ce concentration of 30 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 12% and the relative light output value (%) was 18%. The results are shown in Table 1.

Comparative Example 2

$La_2O_3$, $Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.2 μm expressed by $(La_{0.59}Gd_{0.4}Ce_{0.01})_3Al_5O_{12}$ (Ce concentration of 1 mol %) was obtained.

A sintered body expressed by $(La_{0.59}Gd_{0.4}Ce_{0.01})_3Al_5O_{12}$ (Ce concentration of 1 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 38% and the relative light output value (%) was 87%. The results are shown in Table 1.

Comparative Example 3

$Tb_4O_7$, $Gd_2O_3$, $Al_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 4.8 μm expressed by $(Tb_{0.79}Gd_{0.2}Ce_{0.01})_3Al_5O_{12}$ (Ce concentration of 1 mol %) was obtained.

A sintered body expressed by $(Tb_{0.79}Gd_{0.2}Ce_{0.01})_3Al_5O_{12}$ (Ce concentration of 1 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 30% and the relative light output value (%) was 80%. The results are shown in Table 1.

Comparative Example 4

$Gd_2O_3$, $Ga_2O_3$ and $CeO_2$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.1 μm expressed by $(Gd_{0.7}Ce_{0.3})_3Ga_5O_{12}$ (Ce concentration of 30 mol %) was obtained.

A sintered body expressed by $(Gd_{0.7}Ce_{0.3})_3Ga_5O_{12}$ (Ce concentration of 30 mol %) in the same manner as in the Example 1 except the use of the phosphor powder was obtained and a ceramic scintillator was fabricated.

The transmittance and the light output of the obtained ceramic scintillator were measured in the same manner as in the Example 1. The transmittance was 21% and the relative light output value (%) was 54%. The results are shown in Table 1.

Comparative Example 5

$Gd_2O_3$, $Al_2O_3$ and $Pr_7O_{11}$ were powder-mixed at a predetermined composition ratio to obtain a total weight of 500 g and then fired at 1200° C. under an Ar gas atmosphere. Then, rare-earth oxides phosphor powder with an average particle diameter $D_{50}$ of 5.0 μm expressed by $(Gd_{0.7}Pr_{0.3})_3Al_5O_{12}$ (Pr concentration of 30 mol %) was obtained.

A sintered body expressed by $(Gd_{0.7}Pr_{0.3})_3Al_5O_{12}$ (Pr concentration of 30 mol %) in the same manner as in the Example 1 except the use of the phosphor powder was obtained and a ceramic scintillator was fabricated.

When an X-ray with a tube voltage of 120 Kvp is emitted, the ceramic scintillator emits visible light with a peak wavelength near 610 nm. For this reason, the transmittance of the obtained ceramic scintillator was measured in the same manner as in the Example 1 except the use of light with a wavelength of 610 nm instead of light with a wavelength of 550 nm. Moreover, the light output of the ceramic scintillator was measured in the same manner as in the Example 1. The transmittance was 16% and the relative light output value (%) was 27%. The results are shown in Table 1.

TABLE 1

| | Composition of the Solid Scintillator | Transmittance of Light having Wavelength of 550 nm % | Transmittance of Light having Wavelength of 610 nm % | Relative Light Output Value |
|---|---|---|---|---|
| Example 1 | $(Gd_{0.99}Ce_{0.01})_3Al_5O_{12}$ | 52 | — | 128 |
| Example 2 | $(Tb_{0.49}Gd_{0.5}Ce_{0.01})_3Al_5O_{12}$ | 63 | — | 142 |
| Example 3 | $(La_{0.49}Gd_{0.5}Ce_{0.01})_3Al_5O_{12}$ | 48 | — | 117 |
| Example 4 | $(Tb_{0.3}Gd_{0.6}Ce_{0.1})_3Ga_5O_{12}$ | 58 | — | 138 |
| Example 5 | $(Gd_{0.99}Pr_{0.01})_3Al_5O_{12}$ | — | 47 | 115 |
| Example 6 | $(Tb_{0.3}Gd_{0.69}Pr_{0.01})_3Ga_5O_{12}$ | — | 57 | 132 |
| Comparative Example 1 | $(Gd_{0.7}Ce_{0.3})_3Al_5O_{12}$ | 12 | — | 18 |
| Comparative Example 2 | $(La_{0.59}Gd_{0.4}Ce_{0.01})_3Al_5O_{12}$ | 38 | — | 87 |
| Comparative Example 3 | $(Tb_{0.79}Gd_{0.2}Ce_{0.01})_3Al_5O_{12}$ | 30 | — | 80 |
| Comparative Example 4 | $(Gd_{0.7}Ce_{0.3})_3Ga_5O_{12}$ | 21 | — | 54 |
| Comparative Example 5 | $(Gd_{0.7}Pr_{0.3})_3Al_5O_{12}$ | — | 16 | 27 |

INDUSTRIAL APPLICABILITY

The solid scintillator according to the present invention can be used in, for example, a solid scintillator constituting a radiographic inspection apparatus for use in medical diagnosis, industrial inspection, and security fields and, specifically, a solid scintillator constituting a radiation detector, an x-ray tomographic imaging apparatus, and the like.

The radiation detector according to the present invention can be used in, for example, a radiation detector for use in medical diagnosis, industrial inspection, and security fields.

The x-ray tomographic imaging apparatus according to the present invention can be used in, for example, an x-ray tomographic imaging apparatus for use in medical diagnosis, industrial inspection, and security fields.

The invention claimed is:

1. A solid scintillator represented by the following formula (1):

$$(Tb_{1-x-y}Gd_xCe_y)_3J_5O_{12} \tag{1}$$

wherein

J is at least one metal selected from the group consisting of Al, Ga, and In; and x and y are 0.5<x<1 and 0.000001≤y≤0.2, wherein transmittance of light having a wavelength of 550 nm measured at a thickness of 2 mm is equal to or greater than 40%.

2. A solid scintillator represented by the following formula (2):

$$(Tb_{1-x-y}Gd_xPr_y)_3J_5O_{12} \qquad (2)$$

wherein

J is at least one metal selected from the group consisting of Al, Ga, and In; and x and y are 0.5<x<1 and 0.000001≤y≤0.2, wherein transmittance of light having a wavelength of 610 nm measured at a thickness of 2 mm is equal to or greater than 40%.

3. A radiation detector comprising the solid scintillator according to claim 1.

4. An x-ray tomographic imaging apparatus comprising the radiation detector according to claim 3.

5. A radiation detector comprising the solid scintillator according to claim 2.

6. An x-ray tomographic imaging apparatus comprising the radiation detector according to claim 5.

7. The solid scintillator according to claim 1, wherein:

0.6≤x<1.

8. The solid scintillator according to claim 1, wherein:

0.001≤y≤0.1.

9. The solid scintillator according to claim 1, wherein J is Al.

10. The solid scintillator according to claim 1, wherein J is Ga.

11. The solid scintillator according to claim 1, wherein J is In.

12. The solid scintillator according to claim 1, which is $(Tb_{0.3}Gd_{0.6}Ce_{0.1})_3Ga_5O_{12}$.

13. A radiation detector comprising the solid scintillator according to claim 12.

14. The solid scintillator according to claim 2, wherein:

0.69≤x<1.

15. The solid scintillator according to claim 2, wherein:

0.0001≤y≤0.01.

16. The solid scintillator according to claim 2, wherein J is Al.

17. The solid scintillator according to claim 2, wherein J is Ga.

18. The solid scintillator according to claim 2, wherein J is In.

19. The solid scintillator according to claim 2, which is $(Tb_{0.3}Gd_{0.6}Ce_{0.1})_3Ga_5O_{12}$.

20. A radiation detector comprising the solid scintillator according to claim 19.

* * * * *